(12) United States Patent
Zhu et al.

(10) Patent No.: US 9,904,648 B2
(45) Date of Patent: Feb. 27, 2018

(54) CARD CONNECTOR SUITABLE FOR INSERTION OF CARD, BASE SUITABLE FOR INSERTION OF DEVICE, AND TERMINAL

(71) Applicant: Huawei Device Co., Ltd., Shenzhen (CN)

(72) Inventors: Jianwei Zhu, Beijing (CN); Yubo Lin, Shenzhen (CN)

(73) Assignee: Huawei Device (Dongguan) Co., Ltd., Shenzhen (CN)

( * ) Notice: Subject to any disclaimer, the term of this patent is extended or adjusted under 35 U.S.C. 154(b) by 0 days.

(21) Appl. No.: 14/917,183

(22) PCT Filed: Dec. 27, 2014

(86) PCT No.: PCT/CN2014/095227
§ 371 (c)(1),
(2) Date: Mar. 7, 2016

(87) PCT Pub. No.: WO2015/096814
PCT Pub. Date: Jul. 2, 2015

(65) Prior Publication Data
US 2016/0292118 A1    Oct. 6, 2016

(30) Foreign Application Priority Data

Dec. 27, 2013    (CN) .................... 2013 2 0877784 U

(51) Int. Cl.
*G06F 13/00*    (2006.01)
*G06F 13/40*    (2006.01)
*G06K 7/00*    (2006.01)

(52) U.S. Cl.
CPC ....... *G06F 13/4068* (2013.01); *G06K 7/0026* (2013.01)

(58) Field of Classification Search
None
See application file for complete search history.

(56) References Cited

U.S. PATENT DOCUMENTS

| 6,039,599 | A | 3/2000 | Benjamin et al. |
| 9,444,208 | B2 * | 9/2016 | Zhang ................ G06K 7/0073 |
| 2009/0163081 | A1 | 6/2009 | Zhang et al. |

FOREIGN PATENT DOCUMENTS

| CN | 201061049 Y | 5/2008 |
| CN | 201178143 Y | 1/2009 |
| CN | 202076639 U | 12/2011 |
| CN | 203707435 U | 7/2014 |

* cited by examiner

*Primary Examiner* — Cheng-Yuan Tseng

(57) ABSTRACT

The present invention discloses to a card connector, a base, and a terminal. The card connector suitable for insertion of a card includes a bottom board, where the bottom board is provided with a first-size area that is formed by side walls; the bottom board is further provided with a second-size area that is formed by locking units; when a first card is inserted into the card connector, the locking units are pressed down by the first card, and the first card is locked within the first-size area; and when the second card is inserted into the card connector, the second card is locked within the second-size area. A base is disposed with side walls and locking units to form areas of different sizes, so that the card connector can be equipped with devices of different sizes, and can be highly versatile, widely applicable, and convenient to use.

14 Claims, 3 Drawing Sheets

CARD CONNECTOR SUITABLE FOR INSERTION OF CARD, BASE SUITABLE FOR INSERTION OF DEVICE, AND TERMINAL

CROSS REFERENCE TO RELATED APPLICATIONS

The present application claims priority under 35 U.S.C. § 365 to International Patent Application No. PCT/CN2014/095227 filed Dec. 27, 2014. International Patent Application No. PCT/CN2014/095227 claims priority under 35 U.S.C. § 365 and/or 35 U.S.C. § 119 (a) to Chinese Patent Application No. 201320877784.7 filed Dec. 27, 2013 and which are incorporated herein by reference into the present disclosure as if fully set forth herein.

TECHNICAL FIELD

The present invention relates to the field of electronics technology, and in particular, to a card connector suitable for insertion of a card, a base suitable for insertion of a device, and a terminal.

BACKGROUND

At present, data cards generally need to be equipped in various kinds of electronic products to implement specific functions. For example, a mobile terminal (for example, a mobile phone) needs to be equipped with a SIM (Subscriber Identity Module, subscriber identity module) card for use. A chip of the SIM card stores content, such as information about a digital mobile phone user, an encryption key, and a phonebook of the user, which can be used for authenticating an identity of the digital mobile network user and encrypting voice information during a call of the user.

At present, SIM cards are classified into standard SIM cards, MicroSIM cards (micro-SIM card), and MiniSIM cards (mini-SIM card). Their basic functions are the same, but their sizes vary obviously. The standard SIM card and the micro-SIM card are used as an example. Table 1 shows key outline sizes of the standard SIM card and the micro-SIM card. It can be seen from the following comparison that their basic outline sizes are all different, but their electrical contacts are the same in size and spacing; therefore card connectors used to fasten the SIM cards are totally different in outline sizes, but metal pins, on the card connectors, in contact with the electrical contacts of the foregoing standard SIM card and micro-SIM card are the same.

TABLE 1

| Size | SIM Card | Micro SIM Card |
| --- | --- | --- |
| Outline length | 25 mm | 15 mm |
| Outline width | 15 mm | 12 mm |
| Outline corner cutting | 3 mm | 2.5 mm |
| Contact size | 2 mm * 1.7 mm | 2 mm * 1.7 mm |
| Contact spacing | 5.62 mm * 0.84 mm | 5.62 mm * 0.84 mm |

Even if the electrical contacts are the same, because the outline sizes are different, at present, special attention needs to be paid to designs of the card connectors for the two types of SIM cards in the industry.

As shown in FIG. 1, FIG. 1 is a standard SIM card connector that is provided with a locking mechanism, and the standard SIM card connector is suitable for insertion of a standard SIM card. As shown in FIG. 2, FIG. 2 is a micro-SIM card connector that is suitable for insertion of a micro-SIM card.

Disadvantages of the card connectors are that one type of card connector is suitable for insertion of only one corresponding type of SIM card and cannot match different SIM cards, and that different card connectors are applied to different main boards. Therefore, in the prior art shown in FIG. 1 and FIG. 2, only one card connector and one SIM card matching the card connector can be disposed on one terminal.

As an improvement, another prior art further puts forth that two different types of card connectors, such as a card connector suitable for a standard SIM card and a card connector suitable for a micro-SIM card, may be applied to a same main board of one terminal, and one of the two card connectors can be selected for use. Therefore, in this prior art, two card connectors and two SIM cards respectively corresponding to the card connectors can be disposed on one terminal. However, for a same card connector, it is still impossible that the same card connector is compatible with two types of SIM cards.

In addition, in still another prior art, a micro-SIM card is enclosed in a plastic card adapter, so that a size of the micro-SIM card can be expanded to that of a standard SIM card. Compared with the foregoing prior arts, this manner is more compatible and more convenient, but is disadvantageous in that the card adapter requires secondary assembly, where both card adapter tolerance and assembly tolerance are likely to cause poor assembly. In addition, a standard SIM card requires relatively high assembly precision. As a result, the micro-SIM card is likely to fall loose and consequently cannot be used normally. In addition, this type of card adapter needs to be additionally purchased by a user, which is not convenient enough for use.

Although the foregoing discusses card connectors, the inventor also finds that other bases for insertion of devices, similar to a card connector, also have the problem that a same base is not compatible with different devices.

SUMMARY

Embodiments of the present invention provide a card connector suitable for insertion of a card, a base suitable for insertion of a device, and a terminal, so as to overcome a problem that a prior-art base can be equipped with one device of only a particular size and that consequently, a utilization rate of the base is relatively low and manufacturing costs of the base are relatively high.

Technical solutions provided in the embodiments of the present invention are as follows:

According to one aspect, a card connector suitable for insertion of a card is provided, where the card includes a first card and a second card, a size of the first card is greater than a size of the second card, and the card connector includes a bottom board, where the bottom board is provided with side walls, where the side walls form a first-size area that holds the first card;

the bottom board is further provided with locking units, where the locking units form a second-size area that holds the second card, the second-size area is located within the first-size area, and the locking units are capable of being pressed down or sprung back; and the card connector is so set that:

when the first card is inserted into the card connector, the locking units are pressed down by the first card, and the first card is locked within the first-size area formed by the side walls; and when the second card is inserted into the card connector, the second card is locked within the second-size area formed by the locking units.

Preferably, an opening for card insertion is provided on one lateral side of the bottom board, and the side walls are located on other lateral sides of the bottom board other than the lateral side on which the opening for card insertion is located, to form the first-size area.

Preferably, on the bottom board on inner sides of the side walls, the locking units are provided on the other lateral sides other than the lateral side on which the opening for card insertion is located, to foist the second-size area.

Preferably, the locking units are made of an elastic material.

Preferably, the locking units are locking ribs.

Preferably, elastic assemblies are disposed between the locking units and the bottom board.

Preferably, the elastic assemblies are springs.

Preferably, the locking ribs are provided with a slope along a card insertion direction, so that the slope helps the first card press down the locking ribs.

Preferably, the locking ribs are in a one-section structure or the locking ribs are in a multi-section structure.

Preferably, the bottom board is provided with pins, electrical contacts are disposed in middle positions of the first card and the second card, and the first card and the second card come into contact with the pins by means of the electrical contacts to implement an electrical connection with the card connector.

According to another aspect, a terminal is further provided, including the foregoing card connector for insertion of a card.

According to still another aspect, the present invention further provides a base suitable for insertion of a device, where the device includes a first device and a second device, a size of the first device is greater than a size of the second device, and the base includes a bottom board, where the bottom board is provided with side walls, where the side walls form a first-size area that holds the first device;

the bottom board is further provided with locking units, where the locking units form a second-size area that holds the second device, the second-size area is located within the first-size area, and the locking units are capable of being pressed down or sprung back; and the base is so set that:

when the first device is inserted into the base, the locking units are pressed down by the first device, and the first device is locked within the first-size area formed by the side walls; and when the second device is inserted into the base, the second device is locked within the second-size area formed by the locking units.

Preferably, the locking units are made of an elastic material.

Preferably, elastic assemblies are disposed between the locking units and the bottom board.

Preferably, the locking units are provided with a slope along a device insertion direction, so that the slope helps the first device press down the locking ribs.

In the embodiments of the present invention, a base is disposed with side walls and locking units to form areas of different sizes, so that the base can be equipped with devices of different sizes, and can be highly versatile, widely applicable, and convenient to use.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present inventionwith reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following describes main implementation principles, specific implementation manners, and corresponding advantageous effects that can be achieved by the technical solutions provided in the embodiments of the present invention with reference to the accompanying drawings.

Figure 1:
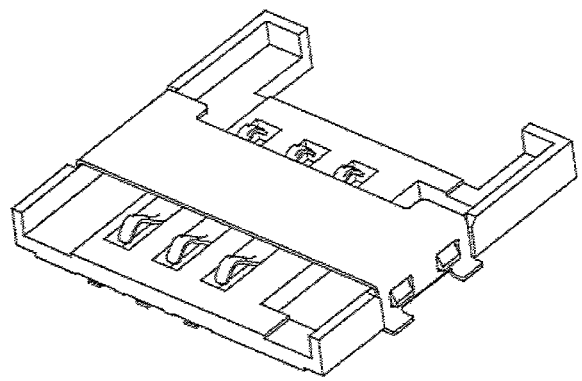
FIG. 1 is a schematic structural diagram of a card connector suitable for a standard SIM card in a first prior art.
Figure 2:
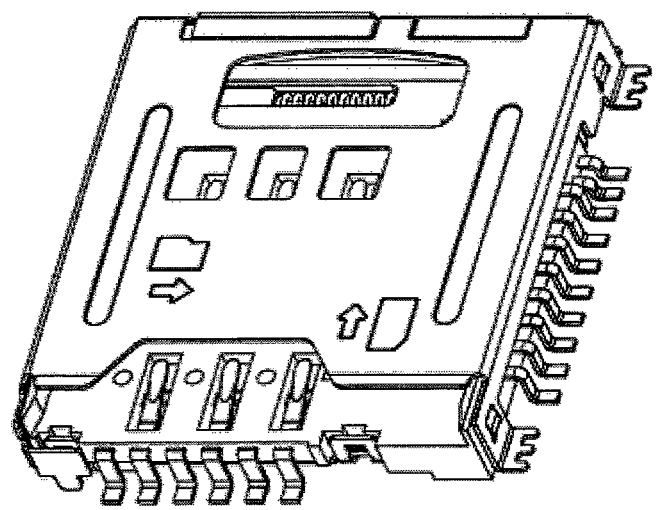
FIG. 2 is a schematic structural diagram of a card connector suitable for a micro-SIM card in the first prior art.
Figure 3:
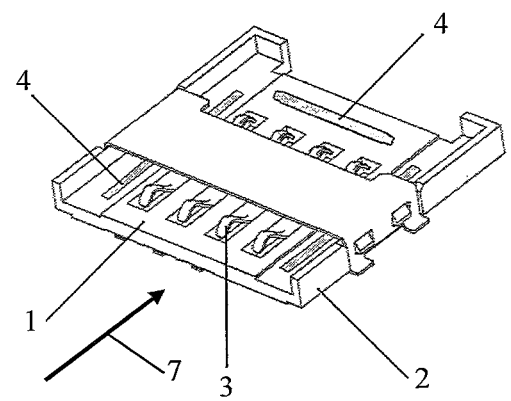
FIG. 3 is a three-dimensional structural diagram of a card connector according to an embodiment of the present invention.
Figure 4:
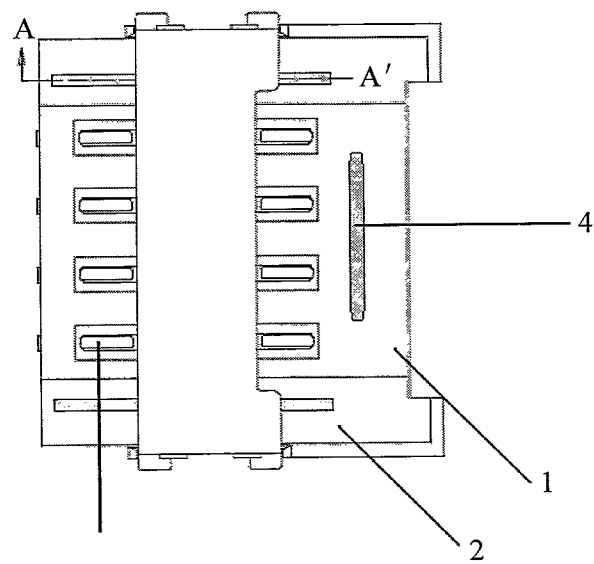
FIG. 4 is a top structural view of a card connector according to an embodiment of the present invention.
Figure 5:
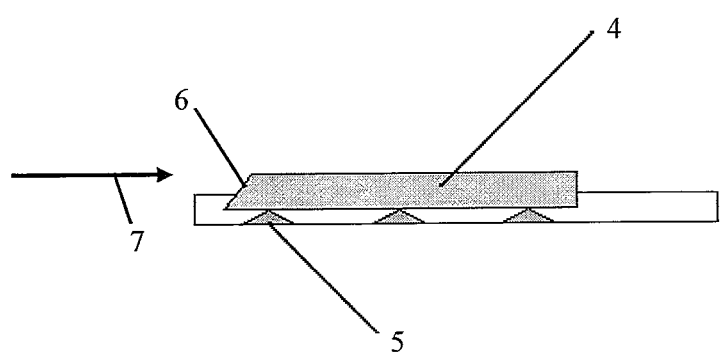
FIG. 5 is an A-A' sectional view of a card connector according to an embodiment of the present invention, where 1—bottom board; 2—side wall; 3—pin; 4—locking unit; 5—elastic assembly.

As shown in FIG. 3 to FIG. 5, the present invention provides a card connector suitable for insertion of a card, where the card includes a first card and a second card, a size of the first card is greater than a size of the second card, and a size of the card mainly refers to parameters such as an outline length, an outline width, an outline corner cutting, and a contact size of the card. For example, for a standard SIM card, an outline length is 25 mm, an outline width is 15 mm, an outline corner cutting is 3 mm, and a contact size is 2 mm*1.7 mm; for a Micro SIM card, an outline length is 15 mm, an outline width is 2.5 mm, and a contact size is 2 mm*1.7 mm. It can be seen that different cards vary in outline length, outline width, and outline corner cutting, but their contact sizes are the same; therefore, areas of different sizes do not affect an electrical connection between electrical contacts and pins at all.

A base includes a bottom board 1, where the bottom board 1 includes a first-size area that is formed by side walls 2, and the bottom board 1 further includes a second-size area that is formed by locking units 4, where the second-size area is located within the first-size area, and the locking units 4 are capable of being pressed down or sprung back.

The base is specifically so set that:

when the first card is inserted into the card connector, the locking units 4 are pressed down by the first card, and the first card is locked within the first-size area formed by the side walls 2; and when the second card is inserted into the card connector, the second card is locked within the second-size area formed by the locking units 4.

In this embodiment of the present invention, in a same base, a first-size area that is formed by side walls is disposed, and a second-size area that is formed by locking units is disposed, so that the base can form space to hold cards of two different sizes, and is highly versatile, and convenient to change and use cards of different sizes.

Specifically, an opening for card insertion is provided on one lateral side of the bottom board 1, the side walls 2 are provided on other lateral sides of the bottom board 1 other than the lateral side on which the opening for card insertion is located, the side walls of the bottom board 1 form the first-size area, and the first-size area may hold the larger-size first card.

In addition, on the bottom board 1 on inner sides of the side walls 2, locking units are provided on the other three lateral sides other than the lateral side on which the opening for insertion is located, where the inner sides of the side walls specifically refer to sides facing a center of the card connector. The locking units form the second-size area, and the second-size area may hold the smaller-size second card.

In an actual application, when the first card is inserted into the card connector, the locking units are capable of being pressed down, so that the first card can be fully located in the first-size area, and when the second card is inserted, it is required that the pressed-down locking units automatically spring back. Based on this requirement, on the one hand, the locking units 4 made of an elastic material may be set. The elastic material has good softness and rebound resilience, which makes it convenient for the first card to press down the locking units. Specifically, the locking units 4 may be locking ribs. To make it more convenient for the first card to press down the locking ribs, the locking ribs are provided with a slope 6 along a card insertion direction 7. In order to enclose the second card in the second-size area, the locking ribs may be in a one-section structure, or certainly, the locking ribs may be in a multi-section structure.

On the other hand, elastic assemblies 5 may be disposed between the locking units 4 and the bottom board 1, so that the locking units 4 is pressed down and sprung back. The elastic assemblies 5 are preferably springs which provide good elastic force for the locking units 4 to be pressed down and sprung back.

In addition, it needs to be noted that, the bottom board 1 is provided with pins 3, electrical contacts are disposed in middle positions of the first card and the second card, and the first card and the second card come into contact with the pins 3 by means of the electrical contacts to implement an electrical connection with the card connector. The foregoing has already described that, although the first card and the second card vary in outline length and width, their electrical contacts are the same in size; therefore, an effective electrical connection between electrical contacts and pins in areas of different sizes can be ensured.

In addition, an embodiment of the present invention further provides a terminal, including the foregoing card connector suitable for insertion of a card. The terminal may be, for example, a mobile phone, a card camera, and the like.

In this embodiment of the present invention, a base is disposed with side walls and locking units to form areas of different sizes, so that the card connector can be equipped with devices of different sizes, and can be highly versatile, widely applicable, and convenient to use.

Based on the assembling principle of the foregoing card connector, the foregoing structure can also be applied to other bases that are for insertion of devices and are similar to a card connector. Specifically, a base suitable for insertion of a device is provided, where the device includes a first device and a second device, a size of the first device is greater than a size of the second device, and the base includes a bottom board, where the bottom board is provided with side walls, where the side walls form a first-size area that holds the first device;

the bottom board is further provided with locking units, where the locking units form a second-size area that holds the second device, the second-size area is located within the first-size area, and the locking units are capable of being pressed down or sprung back; and the base is so set that:

when the first device is inserted into the base, the locking units are pressed down by the first device, and the first device is locked within the first-size area formed by the side walls; and when the second device is inserted into the base, the second device is locked within the second-size area formed by the locking units.

Specific settings and a working principle of the base are not further described herein because they are similar to those of the foregoing card connector, and they can be obtained by a person skilled in the art by making reference to the descriptions of the foregoing card connector.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A card connector suitable for insertion of a card along a card insertion direction, wherein the card comprises a first card and a second card, a size of the first card is greater than a size of the second card, the card connector comprising:

a bottom board, comprising,
one lateral side of the bottom board providing an opening for card insertion along a card insertion direction,
side walls located on lateral sides of the bottom board other than the lateral side on which the opening for card insertion is located forming a first-size area for holding the first card, and
locking units forming a second-size area for holding the second card, wherein the second-size area is located within the first-size area and the locking units are capable of being pressed down or sprung back; and wherein the card connector is configured so that:
the first card and the second card are insertable along the card insertion direction through the opening for card insertion,
when the first card is inserted along the card insertion direction into the card connector through the opening for card insertion, the locking units are pressed down by the first card, and the first card is locked within the first-size area formed by the side walls, and when the second card is inserted along the card insertion direction into the card connector through the opening for card insertion, the locking units automatically spring back, and the second card is locked within the second-size area formed by the locking units.

2. The card connector according to claim 1, wherein on the bottom board within an area surrounded by the side walls, the locking units are provided on the other lateral sides other than the lateral side on which the opening for card insertion is located, to form the second-size area.

3. The card connector according to claim 2, wherein the locking units comprise an elastic material.

4. The card connector according to claim 3, wherein the locking units comprise locking ribs.

5. The card connector according to claim 2, wherein elastic assemblies are disposed between the locking units and the bottom board.

6. The card connector according to claim 5, wherein the elastic assemblies comprise springs.

7. The card connector according to claim 4, wherein the locking ribs are provided with a slope along the card insertion direction, so that the slope helps the first card press down the locking ribs.

8. The card connector according to claim 7, wherein the locking ribs are in a one-section structure or the locking ribs are in a multi-section structure.

9. The card connector according to claim 1, wherein the bottom board further comprises:
pins; and
electrical contacts disposed in middle positions of the first card and the second card, and wherein the first card and the second card come into contact with the pins by means of the electrical contacts to implement an electrical connection with the card connector.

10. A terminal, comprising:
a device; and
a card connector disposed on the device, the card connector being suitable for insertion of a card along a card insertion direction, wherein the card comprises a first card and a second card, a size of the first card is greater than a size of the second card, the card connector comprising:
a bottom board, comprising,
one lateral side of the bottom board providing an opening for card insertion along a card insertion direction,
side walls located on lateral sides of the bottom board other than the lateral side on which the opening for card insertion is located forming a first-size area for holding the first card,
locking units forming a second-size area for holding the second card, wherein the second-size area is located within the first-size area and the locking units are capable of being pressed down or sprung back, and
wherein the card connector is configured so that:
the first card and the second card are insertable along the card insertion direction through the opening for card insertion;
when the first card is inserted along the card insertion direction into the card connector through the opening for card insertion, the locking units are pressed down by the first card, and the first card is locked within the first-size area formed by the side walls; and
when the second card is inserted along the card insertion direction into the card connector through the opening for card insertion, the locking units automatically spring back, and the second card is locked within the second-size area formed by the locking units.

11. A base suitable for insertion of a device along a device insertion direction, wherein the device comprises a first device and a second device, a size of the first device is greater than a size of the second device, the base comprising:
a bottom board comprising,
one lateral side of the bottom board providing an opening for device insertion along a device insertion direction,
side walls located on lateral sides of the bottom board other than the lateral side on which the opening for device insertion is located forming a first-size area for holding the first device, and
locking units forming a second-size area for holding the second device, wherein the second-size area is located within the first-size area and the locking units are capable of being pressed down or sprung back; and
wherein the base is configured so that:
the first device and the second device are insertable along the device insertion direction through the opening for device insertion,
when the first device is inserted along the device insertion direction into the base through the opening for device insertion, the locking units are pressed down by the first device, and the first device is locked within the first-size area formed by the side walls, and
when the second device is inserted along the device insertion direction into the base through the opening for device insertion, the locking units automatically spring back, and the second device is locked within the second-size area formed by the locking units.

12. The base according to claim 11, wherein the locking units comprise an elastic material.

13. The base according to claim 11, wherein elastic assemblies are disposed between the locking units and the bottom board.

14. The base according to claim 13, wherein the locking units are provided with a slope along the device insertion direction, so that the slope helps the first device press down the locking ribs.

* * * * *